United States Patent
Schneider

(10) Patent No.: US 9,963,003 B2
(45) Date of Patent: May 8, 2018

(54) METHOD AND DEVICE FOR ASSISTING A DRIVER OF A VEHICLE, IN PARTICULAR A COMMERCIAL VEHICLE

(71) Applicant: MAN Truck & Bus AG, München (DE)

(72) Inventor: Bernhard Schneider, Erdweg (DE)

(73) Assignee: MAN Truck & Bus AG, Munich (DE)

( * ) Notice: Subject to any disclaimer, the term of this patent is extended or adjusted under 35 U.S.C. 154(b) by 0 days. days.

(21) Appl. No.: 15/041,686

(22) Filed: Feb. 11, 2016

(65) Prior Publication Data
US 2016/0159173 A1   Jun. 9, 2016

(30) Foreign Application Priority Data
Feb. 12, 2015   (DE) .......... 10 2015 001 803

(51) Int. Cl.
*B60C 23/04*   (2006.01)
*B60C 23/20*   (2006.01)
(Continued)

(52) U.S. Cl.
CPC ...... *B60C 23/0486* (2013.01); *B60C 23/0401* (2013.01); *B60C 23/20* (2013.01);
(Continued)

(58) Field of Classification Search
CPC . B60C 23/0486; B60C 23/0401; B60C 29/06; B60C 23/20; F16K 15/20; F16K 37/00; G01C 21/3415; G08B 19/00
See application file for complete search history.

(56) References Cited

U.S. PATENT DOCUMENTS

| | | | |
|---|---|---|---|
| 6,148,888 A | 11/2000 | Loureiro Benimeli | |
| 7,320,246 B2 | 1/2008 | Schick et al. | |
| 2006/0093015 A1* | 5/2006 | Ichihara | B60C 23/0408 374/45 |

FOREIGN PATENT DOCUMENTS

| | | |
|---|---|---|
| CN | 1475376 | 2/2004 |
| CN | 201472086 | 5/2010 |

(Continued)

OTHER PUBLICATIONS

Search Report dated Jun. 16, 2015 issued in the corresponding Swedish Patent Application.
(Continued)

*Primary Examiner* — Mussa A Shaawat
*Assistant Examiner* — Michael V Kerrigan
(74) *Attorney, Agent, or Firm* — Cozen O'Connor

(57) ABSTRACT

In a method for assisting a driver of a vehicle, a closed loop control device and/or open loop control device is switchable into multiple warning stages such that: if at least one temperature value measured by a temperature sensor exceeds a first defined threshold value, the closed loop control device and/or open loop control device switches into a first warning stage in which it is indicated to the driver to stop the vehicle within a defined period of time and/or within a defined section of road and/or that the driver is not to exceed a defined speed value. If the measured temperature value exceeds a second defined threshold value, greater than the first threshold value, the closed loop control device and/or open loop control device switches into a second warning stage in which it is indicated to the driver that the driver is to stop the vehicle immediately.

19 Claims, 5 Drawing Sheets

(51) Int. Cl.
    *G01C 21/34*     (2006.01)
    *G08B 19/00*     (2006.01)
    *B60C 29/06*     (2006.01)
    *F16K 15/20*     (2006.01)
    *F16K 37/00*     (2006.01)

(52) U.S. Cl.
    CPC .............. *B60C 29/06* (2013.01); *F16K 15/20* (2013.01); *F16K 37/005* (2013.01); *G01C 21/3415* (2013.01); *G08B 19/00* (2013.01)

(56) References Cited

FOREIGN PATENT DOCUMENTS

| | | |
|---|---|---|
| CN | 203093632 | 7/2013 |
| CN | 203126409 | 8/2013 |
| CN | 203172364 | 9/2013 |
| CN | 203358231 | 12/2013 |
| EP | 0301443 | 2/1989 |
| EP | 1544002 | 6/2005 |
| JP | 2005-186658 | 7/2005 |
| JP | 2007-050735 | 3/2007 |
| KR | 20140145761 | 12/2014 |
| WO | WO 02/07993 | 1/2002 |
| WO | WO 02/25291 | 3/2002 |
| WO | WO 2004/000581 | 12/2003 |

OTHER PUBLICATIONS

Search Report dated Jun. 9, 2016 issued in the corresponding European Patent Application No. 1600273.

\* cited by examiner

METHOD AND DEVICE FOR ASSISTING A DRIVER OF A VEHICLE, IN PARTICULAR A COMMERCIAL VEHICLE

BACKGROUND OF THE INVENTION

1. Field of the Invention

The invention relates to a method for assisting a driver of a vehicle, in particular a commercial vehicle, a device for assisting a driver of a vehicle, in particular a commercial vehicle, an assembly unit and a vehicle, in particular a commercial vehicle, for implementing the method and/or having the device and/or having at least one assembly unit.

2. Description of the Related Art

In the case of vehicles, in particular in the case of commercial vehicles, it is possible for the temperature of vehicle tires to increase so intensely during a journey that the tires catch fire. The cause of an increase in temperature of this type is frequently an air pressure that is too low in a vehicle tire that is embodied as a pneumatic tire, whereby during the journey the deformation or the distortion of the vehicle tire is clearly increased. Frequently, even a gradual drop in pressure of the vehicle tire is enough to increase the distorting movement of the vehicle tire to a critical extent. It is dangerous for the vehicle tires to ignite in particular in the case of transporting dangerous goods, since, by way of example, the ignition could also lead to a fuel tank fire or to the load igniting.

It is known to continuously measure the temperature of the vehicle tire during a journey with the vehicle to prevent a vehicle tire igniting. For this purpose, a temperature sensor is typically arranged in a hollow chamber of a vehicle tire that is embodied as a pneumatic tire, the hollow chamber being filled with air. A transmitting device is then allocated to the temperature sensor and the measuring signal of the temperature sensor is then transmitted to an indicating device of the vehicle by the transmitting device and the indicating device indicates information regarding the state of the vehicle tire to the driver of the vehicle. With the aid of this information, it is possible for the driver to perform suitable measures in order to prevent the vehicle tire igniting.

A system of this type is disclosed, by way of example, in DE 102 36 140 A1, which discloses a device for measuring the air temperature of a tire, wherein a tire valve that can be attached to a wheel rim of the tire is connected to a receiving arrangement for a transducer. In the state in which the tire valve is attached to the wheel rim, the receiving arrangement is located in a hollow space of the tire, the tire being embodied as a pneumatic tire, so that the air temperature in the hollow space of the tire can be measured by the at least one transducer. The measured values are then relayed to a receiver arranged in a vehicle interior and are indicated to the driver of the vehicle. In the case in which the measured values are in excess of or rather below a critical value, a corresponding signal is generated in addition.

SUMMARY OF THE INVENTION

An object of the invention is to provide a method and a device for assisting a driver of a vehicle, in particular a commercial vehicle, making it is possible in a particularly reliable manner using the method and device to prevent a vehicle tire igniting.

In accordance with one aspect of the invention, a method for assisting a driver of a vehicle, in particular a commercial vehicle, is proposed, wherein the vehicle comprises at least one vehicle tire that is embodied in particular as a pneumatic tire, and wherein at least one temperature sensor is provided and it is possible by the temperature sensor to measure a temperature of the vehicle tire. In addition, the vehicle comprises an indicating device, in particular a visual and/or acoustic indicating device, and it is possible by the indicating device to indicate to the driver of the vehicle information regarding the state of the vehicle tire. Furthermore, the vehicle also comprises a closed loop control device and/or an open loop control device connected to the temperature sensor in a signal-transmitting manner and it is possible by the closed loop control device and/or open loop control device to control the indication procedure of the indicating device in a closed loop and/or open loop manner. In accordance with the invention, the closed loop control device and/or open loop control device can be switched into multiple warning stages. If at least one temperature value that is measured by the temperature sensor exceeds a first defined threshold value, the closed loop control device and/or the open loop control device switches in a self-acting or automatic manner into a first warning stage in which it is indicated to the driver by the indicating device that he is to stop the vehicle within a defined period of time and/or within a defined section of road and/or that he is not to exceed a defined speed value with the vehicle. If the measured temperature value exceeds a second defined threshold value that is embodied as greater than the first threshold value, the closed loop control device and/or open loop control device switches in a self-acting or automatic manner into a second warning stage in which it is indicated to the driver by the indicating device that he is to stop the vehicle immediately.

The temperature of the vehicle tire is particularly reliably prevented in this manner from increasing too intensely and thereby the risk of the tire possibly igniting is also particularly reliably prevented in this manner since the driver is warned in advance by the first warning stage that the state of the vehicle tire can be critical or dangerous in the future. The driver can then perform suitable measures in a timely manner in order to prevent the critical state of the vehicle tire and consequently a dangerous traffic situation. If, for example, it is indicated to the driver that he is to stop the vehicle within a defined period of time and/or within a defined section of road, he can still drive by, for example to a suitable location, for example, a resting area or the like, where he can safely stop his vehicle and can allow the vehicle tire to cool. Where necessary, the vehicle tire can also be exchanged at a suitable location. If it is indicated to the driver, for example, that he is not to exceed a defined speed value with the vehicle, the driver can reduce the vehicle speed in compliance with the speed value and consequently where necessary cool the vehicle tire. The indication can be provided, for example, by a continuous or blinking visual warning signal. However, if the state of the vehicle tire is already critical or dangerous, this is indicated to the driver by the second warning stage. The driver then knows that he must stop the vehicle immediately in order to prevent the vehicle tire igniting.

The at least one temperature value that is measured by the temperature sensor is preferably the temperature that is actually measured by the temperature sensor. Likewise, the at least one temperature value that is measured by the temperature sensor can also comprise multiple temperature values that are measured by the temperature sensor, whereby a temperature curve is produced. The defined threshold value is always embodied in a manner corresponding to the at least one measured temperature value such that the vehicle tire is reliably prevented from igniting.

In a preferred method procedure, the closed loop control device and/or open loop control device switches in a self-acting or automatic manner into a basic mode if the measured temperature value does not exceed the first threshold value and in the basic mode information regarding the state of the vehicle tire is not indicated to the driver by the indicating device. Information regarding the state of the vehicle tire is thus only indicated to the driver if this is also required and/or if it is activated by the driver for indication purposes. Consequently, during a journey with the vehicle, the driver is distracted to a much lesser extent.

It is further preferred that the closed loop control device and/or open loop control device is connected to a speed regulating system of the vehicle in a signal-transmitting manner. If the prevailing vehicle speed is then greater than the defined speed value, the vehicle speed is controlled in a closed loop and/or open loop manner by the speed regulating system in a self-acting manner in such a manner that the vehicle does not exceed the defined threshold value. It can thus be ensured in a reliable and simple manner that the defined speed value is not exceeded.

It is preferred that the closed loop control device and/or the open loop control device comprises a predicting device and it is possible by the predicting device to predict or forecast a future increase in temperature of the vehicle tire in dependence upon at least one tire temperature parameter. The defined period of time and/or the defined section of road can then be determined by the closed loop control device and/or open loop control device by way of this predicted increase in temperature of the vehicle tire. It is possible in this manner to always determine an optimum period of time or section of road in dependence upon the at least one tire temperature parameter. An optimum period of time or section of road can be embodied, for example, such that the driver can still drive as far or as long as possible without the risk of the vehicle tire igniting. However, alternatively and/or in addition to the predicting device, it is possible to store or to save defined pre-set values for the defined period of time and/or for the defined section of road in the closed loop control device and/or the open loop control device. It is preferred that the at least one tire temperature parameter is formed by at least one temperature value that is measured by the temperature sensor and/or by the prevailing and/or future traffic situation of the vehicle. It is possible by the tire temperature parameter that is embodied in this manner to determine in a particularly reliable and highly precise manner the defined period of time and/or the defined section of road.

It is further preferred that the closed loop control device and/or open loop control device is connected to a navigation system of the vehicle in a signal-transmitting manner. As a consequence, it is possible to transmit, for example, data regarding the prevailing and/or future traffic situation of the vehicle to the closed loop control device and/or open loop control device. It is preferred that the navigation system plans a route that is altered taking into account the defined period of time and/or the defined section of road in a self-acting or automatic manner by the closed loop control device and/or open loop control device. It is possible in this manner for the driver of the vehicle to be guided by the altered route plan, for example, to a location at which it is possible to safely stop the vehicle. As a result of the route plan being automatically altered, the vehicle tire is consequently prevented in a particularly reliable and comfortable manner from igniting.

It is preferred that a warning signal is indicated by the indicating device if the closed loop control device and/or open loop control device does not receive a signal of the at least one temperature sensor. The driver is thus reliably informed of the fact that at least one temperature value that is to be measured is not being transmitted to the closed loop control device and/or open loop control device. It is preferred that the warning signal is formed by a so-called check control warning.

In addition for the purpose of achieving the above-mentioned object, a device for assisting a driver of a vehicle, in particular a commercial vehicle, is proposed, wherein the vehicle comprises at least one vehicle tire, the vehicle tire in particular being embodied as a pneumatic tire, and wherein at least one temperature sensor is provided and it is possible by the temperature sensor to measure a temperature of the vehicle tire. In addition, the vehicle comprises an indicating device, in particular a visual and/or acoustic indicating device, and it is possible by the indicating device to indicate to the driver of the vehicle information regarding the state of the vehicle tire. Furthermore, the vehicle also comprises a closed loop control device and/or an open loop control device that is connected to the temperature sensor in a signal-transmitting manner and it is possible by the closed loop control device and/or open loop control device to control the indication procedure of the indicating device in a closed loop and/or open loop manner. In accordance with the invention, the closed loop control device and/or open loop control device can be switched into multiple warning stages. If at least one temperature value that is measured by the temperature sensor exceeds a first defined threshold value, the closed loop control device and/or the open loop control device can switch in a self-acting or automatic manner into a first warning stage in which it can be indicated to the driver by the indicating device that he is to stop the vehicle within a defined period of time and/or within a defined section of road and/or that he is not to exceed a defined speed value with the vehicle. If the measured temperature value exceeds a second defined threshold value that is embodied as greater than the first threshold value, the closed loop control device and/or open loop control device can switch in a self-acting and/or automatic manner into a second warning stage in which it can be indicated to the driver by the indicating device that he is to stop the vehicle immediately.

The advantages that are provided by the device in accordance with the invention are identical to the previously acknowledged advantages of the method procedure in accordance with the invention so that in this case the advantages are not repeated.

It is preferred that the at least one temperature sensor can be embodied as a thermoelement and/or as an NTC temperature sensor. It is further preferred that the closed loop control device and/or open loop control device is fixed to the vehicle in a stationary manner in order to simplify the construction of the device in accordance with the invention. It is preferred in addition that the temperature sensor is allocated to the vehicle tire in order to ensure a highly precise measuring accuracy of the temperature sensor.

It is further preferred that the temperature sensor is connected to the closed loop control device and/or open loop control device by a wireless signal-transmitting device in a signal-transmitting manner, wherein a transmitting device of the signal-transmitting device is allocated to the temperature sensor and it is possible by the transmitting device to transmit the measuring signal of the temperature sensor to a receiving device of the signal-transmitting device, the receiving device being allocated to the closed loop control device and/or open loop control device. In this manner, it is possible in a simple and reliable manner to transmit the measuring signal of the temperature sensor to the closed loop control device and/or open loop control device.

Specifically, the temperature sensor can comprise at least one sensor contact element that can be connected to at least one transmitter contact element of the transmitting device, the transmitter contact element corresponding to the sensor contact element so as to connect the temperature sensor and transmitting device in a signal-transmitting manner. It is preferred that the sensor contact element is in physical contact with the transmitter contact element so as to connect the sensor contact element and transmitter contact element in a signal-transmitting manner. The signal-transmitting connection between the sensor contact element and the transmitter contact element is thus embodied in a particularly reliable manner. In addition, a particularly compact construction is also achieved in this manner.

It is preferred that the at least one sensor contact element is embodied in a rod-like manner in order to embody the temperature sensor in a particularly simple manner. It is further preferred that the at least one transmitter contact element is embodied in an annular and/or plate-shaped manner in order to reliably ensure the contact between the sensor contact element and the transmitter contact element.

Alternatively, it is also possible for the sensor contact element not to be in physical contact with the transmitter contact element so as to connect the sensor contact element and transmitter contact element such that signals can be transmitted, wherein a signal-transmitting device is then provided and it is possible by the said signal-transmitting device to connect the sensor contact element and the transmitter contact element to one another such that signals can be transmitted. The signal-transmitting connection between the sensor contact element and the transmitter contact element can thus be embodied in a particularly simple and flexible manner. The signal-transmitting device can be embodied, for example, as a data cable and/or as an optical and/or as a digital signal-transmitting device. It is preferred that the transmitting device is arranged in a defined vicinity in the region of the temperature sensor to ensure a compact construction and a reliable connection between the sensor contact element and the transmitter contact element.

Fundamentally, the transmitting device can be arranged in a hollow chamber of a vehicle tire that is embodied as a pneumatic tire, the hollow chamber being filled with air, wherein it is then preferred that the sensor contact element is likewise arranged in the hollow chamber. However, it is preferred that the transmitting device is arranged outside the hollow chamber of the vehicle tire that is embodied as a pneumatic tire since the installation or a reliable fastening of the transmitting device in/to the vehicle tire is thus clearly simplified. If the transmitting device is arranged outside the hollow chamber, the sensor contact element is then preferably likewise arranged outside the hollow chamber to render it possible to connect the temperature sensor and the transmitting device to one another in a simple and reliable manner using signal technology.

It is preferred that a fixing device is provided by which the transmitting device is fixed to an air valve of the vehicle tire that is embodied as a pneumatic tire. In this manner, it is possible to fix the transmitting device to the vehicle tire in a particularly simple manner. It is preferred that the fixed transmitting device surrounds the air valve at least in regions and in an annular manner, in particular with a defined spacing. It is thus possible for the transmitting device to be fixed to the air valve in a simple and reliable manner.

It is preferred that the fixing device comprises at least one clamping element and it is possible by the clamping element to clamp or press the transmitting device against an air valve-side stop in order to be able to fix the transmitting device to the air valve in a simple and reliable manner. It is preferred that the clamping element is formed by a fastening element that can be screwed to the air valve, in particular by a nut. It is thus possible to fix the transmitting device to the air valve in a simple and cost-effective manner.

It is preferred that the temperature sensor is fixed to an air valve of the vehicle tire that is embodied as a pneumatic tire. It is thus possible to fix the temperature sensor to the vehicle tire in a particularly simple manner. It is particularly preferred that the temperature sensor is fixed to the air valve such that the temperature, in particular the air temperature, in a hollow chamber of the pneumatic tire can be measured by the temperature sensor, the hollow chamber being filled with air. The state of the vehicle tire can thus be determined in a reliable and highly precise manner.

It is further preferred that the temperature sensor is at least in part vulcanized into the air valve in order to fix the temperature sensor to the air valve in a simple and reliable manner and to ensure an air-tight fastening of the air valve to the vehicle tire. It is preferred that the at least one sensor contact element and/or one measuring region of the temperature sensor for measuring the tire temperature is exposed to the exterior or is accessible from the exterior and/or protrudes from the air valve to render it possible to connect the temperature sensor to the transmitting device and/or to be able to reliably measure the tire temperature.

Furthermore, an air-valve on a vehicle tire that is embodied as a pneumatic tire, and a vehicle, in particular a commercial vehicle, is influenced so as to implement the method in accordance with the invention and/or having the device in accordance with the invention and/or with at least one air valve in accordance with the invention. The advantages that are provided from the air valve are identical to the previously acknowledged advantages of the method in accordance with the invention and/or the device in accordance with the invention so that the advantages are likewise not repeated. It is preferred that each vehicle tire of a vehicle comprises the air valve in accordance with the invention. The vehicle can also, for example, be formed by a vehicle tandem wherein a towing vehicle is coupled to a trailer.

The advantageous embodiments and/or further developments of the invention that are mentioned above can be applied individually or also in arbitrary combinations with one another.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention and its advantageous embodiments and further developments and also its advantages are further explained hereinunder with reference to drawings merely in an exemplary manner.

In the drawings.

DETAILED DESCRIPTION OF THE PRESENTLY PREFERRED EMBODIMENTS

Figure 1:
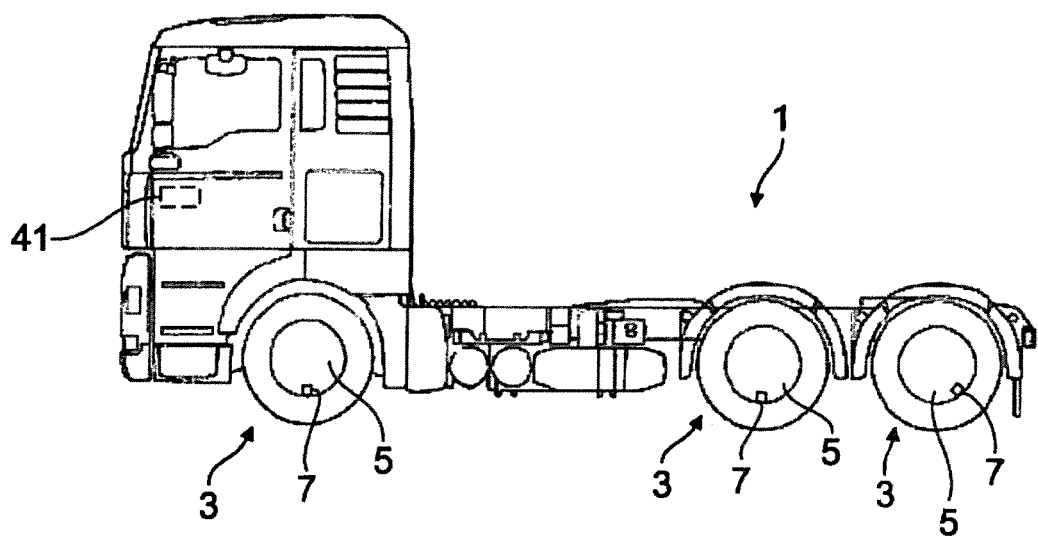
FIG. 1 illustrates a side view of a commercial vehicle having the device in accordance with the invention.

FIG. 1 illustrates a commercial vehicle that is embodied in this case in an exemplary manner as a truck 1. The truck 1 comprises in an exemplary manner multiple, in this case in an exemplary manner six, vehicle tires 3 that are embodied as pneumatic tires. Each of these vehicle tires 3 comprises a rim 5 having an air valve 7 that is fastened to the rim.

Figure 2:
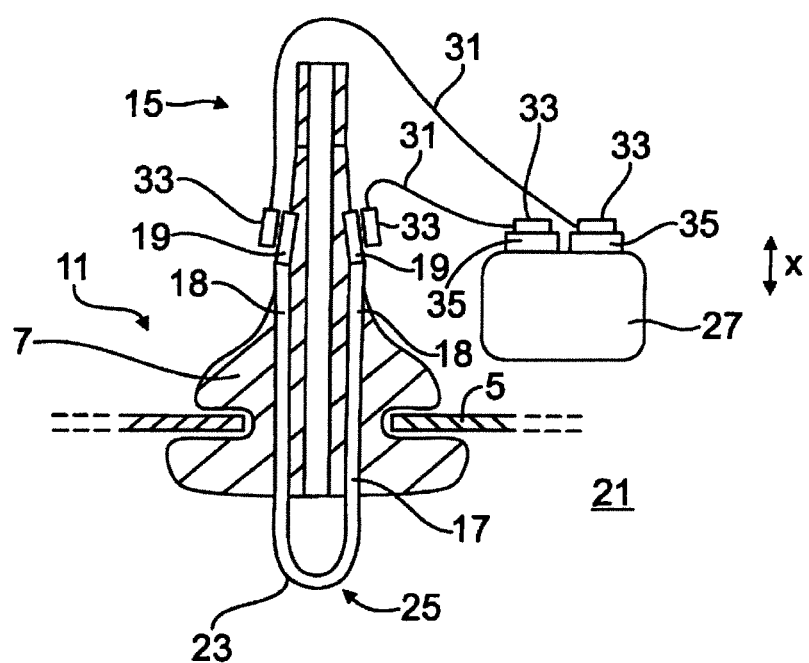
FIG. 2 illustrates a schematic sectional view of an air valve of the commercial vehicle.

FIG. 2 illustrates schematically a section of one of the vehicle tires 3 in the region of its air valve 7. The air valve 7 that is essentially embodied as rotationally symmetrical comprises a fastening device 11, when viewed in the axial direction x, on an end region and it is possible by the fastening device to fasten the air valve 7 to the rim 5 in a sealed manner. On its other end region, when viewed in the axial direction x, the air valve 7 comprises a connecting piece 15 and it is possible to connect, for example, a compressor or the like to the connecting piece so as to fill the vehicle tire 3 with air.

As is further evident in FIG. 2, a temperature sensor 17 is fixed to the air valve 7 merely in an exemplary manner. The air valve 7 and the temperature sensor 17 form an assembly unit. The air temperature in a hollow chamber 21 of the vehicle tire 3 can be measured by the temperature sensor 17. The temperature sensor 17 is embodied in an exemplary manner as an essentially U-shaped thermoelement and comprises on an end region of each U-limb 18 in each case a sensor contact element 19. The sensor contact elements 19 are arranged, for example, when viewed in the axial direction x, between the fastening device 11 and the connecting piece 15 and consequently are arranged outside the hollow chamber 21 of the vehicle tire 3.

The temperature sensor 17 is vulcanized with its U-limbs 18 into the air valve 7 in an exemplary manner so as to fix the temperature sensor 17 to the air valve 7. The sensor contact elements 19 of the temperature sensor 17 protrude from the air valve 7. Alternatively or in addition to vulcanization, it would however also naturally be feasible to fix the temperature sensor 17 to the air valve 7 in another manner, for example, in a materially bonded manner, a positive locking manner and/or a non-positive locking manner.

As is further illustrated in FIG. 2, the temperature sensor 17 protrudes in an exemplary manner with its U-bend 23 from the air valve 7 into the hollow chamber 21 of the vehicle tire 3, the hollow chamber being filled with air. The U-bend 23 forms a measuring region 25 of the temperature sensor 17, by which it is possible to measure the air temperature in the hollow chamber 21 of the vehicle tire 3. The measuring signal of the temperature sensor 17 is transmitted to a transmitting device 27 of a wireless signal-transmitting device 29 (FIG. 3) in an exemplary manner by way of the sensor contact elements 19. The transmitting device 27 is arranged, for example, outside the hollow chamber 21 of the vehicle tire 3 and can be fastened, for example, on the outer side to the rim 5 of the vehicle tire 3.

In accordance with FIG. 2, the transmitting device 27 is connected, merely in an exemplary manner, to the temperature sensor 17 by two cables 31 in a signal-transmitting manner. For this purpose, each cable 31 comprises two cable contact elements 33 of which in each case one is in physical contact with a sensor contact element 19 and another is in physical contact with a transmitter contact element 35 of the transmitting device 27, the transmitter contact element corresponding to this sensor contact element 19.

Figure 3:
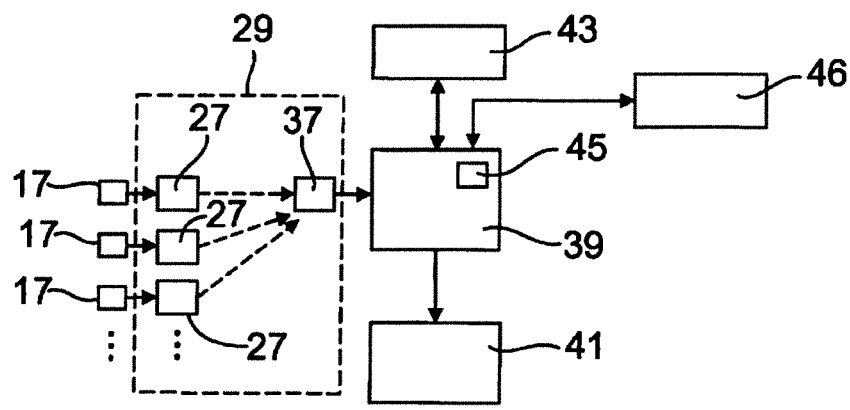
FIG. 3 illustrates a diagram and the procedure of the method in accordance with the invention is explained with reference to the diagram.
Figure 4:
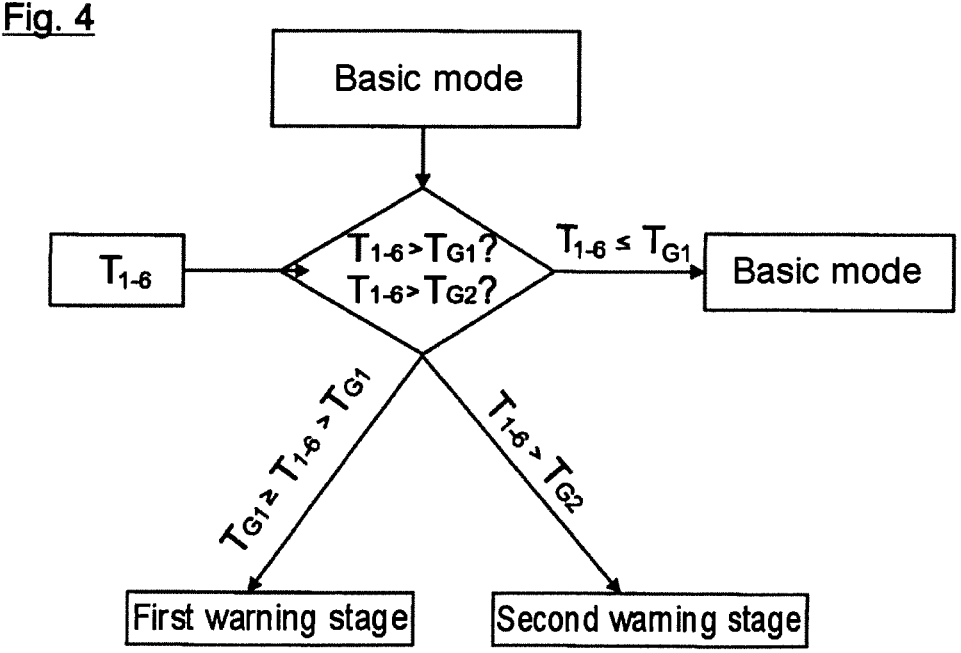
FIG. 4 illustrates a diagram and the construction of the device in accordance with the invention is explained with reference to the diagram.

As is evident in FIG. 3, the transmitting devices 27 allocated to the vehicle tires 3 are connected to a receiving device 37 of the wireless signal-transmitting device 29 in a signal-transmitting manner. In this manner, the measuring signals of the temperature sensors 17 are transferred to the receiving device 37. The receiving device 37 is fixed in a stationary or non-moving manner to the truck 1 and is connected in a data-transmitting manner to a closed loop control device and/or open loop control device 39 fixed to the truck 1 in a likewise stationary or non-moving manner so that the measuring signals received by the receiving device 37 are transmitted to the closed loop control device and/or open loop control device 39. The closed loop control device and/or open loop control device 39 is furthermore connected using signal technology to an indicating device 41 of the truck 1 such that it is possible to control the indication procedure of the indicating device 41 in a closed loop and/or open loop manner by the closed loop control device and/or open loop control device 39. Information regarding the state of the vehicle tire 3 can be indicated to the driver of the truck 1 by the indicating device 41. The indicating device 41 is embodied in an exemplary manner as a screen. The open loop control or closed loop control of the indicating device 41 by the closed loop control device and/or open loop control device 39 is further explained hereinunder with reference to FIG. 4:

If a temperature value $T_{1-6}$ that is measured by the temperature sensor 17 exceeds a first defined threshold value $T_{G1}$ and does not exceed a second threshold value $T_{G2}$ that is embodied as greater than the first threshold value, the closed loop control device and/or the open loop control device 39 switches in a self-acting or automatic manner into a first warning stage in which it is indicated to the driver by the indicating device 41 that he is to stop the truck 1 within a defined period of time and/or within a defined section of road and/or that he is not to exceed a defined speed value with the truck 1. If the measured temperature value of the temperature sensors 17 exceeds the second defined threshold value $T_{G2}$, the closed loop control device and/or open loop control device 39 switches in a self-acting or automatic manner into a second warning stage in which it is indicated to the driver by the indicating device 41 that he is to stop the truck 1 immediately. If none of the temperature values that are measured by the temperature sensors 17 exceed the first threshold value $T_{G1}$, the closed loop control device and/or open loop control device 39 switches in a self-acting or automatic manner into a basic mode in which information regarding the state of the vehicle tire 17 is not indicated by the indicating device 41.

In accordance with FIG. 3, the closed loop control device and/or open loop control device 39 is also connected in an exemplary manner to a navigation system 43 of the truck 1 in a signal-transmitting manner in such a manner that it is possible to transmit data regarding the prevailing and/or future traffic situation of the truck 1 to a predicting device 45 of the closed loop control device and/or open loop control device 39. The predicting device 45 can predict or forecast a future increase in temperature of the vehicle tire 3 by this data and the temperature values that are measured by the temperature sensors 17. In the first warning stage, the closed loop control device and/or open loop control device 39 can then determine by the predicted or forecast increase in temperature the optimum defined period of time or section of road in which the driver of the truck 1 is to stop. Furthermore, it is preferred that the navigation system 43 plans a route that is altered also taking into account the defined period of time and/or the defined section of road in a self-acting or automatic manner by the closed loop control device and/or open loop control device 39.

The closed loop control device and/or open loop control device 39 can furthermore optionally also be connected to a speed regulating system 46 (FIG. 3) of the truck 1. If the prevailing vehicle speed is greater than the defined speed value, it is then possible to control the vehicle speed in a closed loop and/or open loop manner by the speed regulating system in a self-acting manner such that the truck 1 does not exceed the defined speed value.

Figure 5:
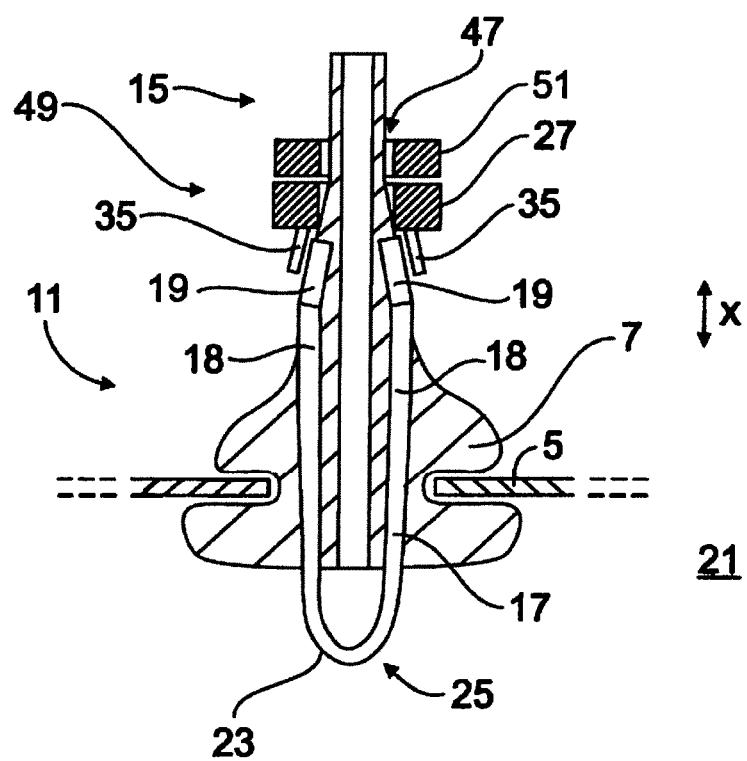
FIG. 5 illustrates in accordance with FIG. 2 the air valve in a second embodiment form.

FIG. 5 illustrates a second embodiment of the air valve 7. In contrast to the first embodiment illustrated in FIG. 2, the transmitter device 27 is fixed to the air valve 7 so that the air valve 7, the temperature sensor 17 and the transmitting device 27 form an assembly unit.

The transmitting device 27 surrounds the air valve in an exemplary manner with a defined spacing in an annular manner and is in physical contact with a stop 49 of the air valve 7. The stop 49 is formed in an exemplary manner by an enlargement of the diameter of the air valve 7. Furthermore, a fastening element is provided that is embodied in an exemplary manner as a nut 51, in particular as a knurled nut, and the transmitting device 27 can be clamped or pressed by the fastening element against the air valve-side stop 49. Alternatively and/or in addition thereto however, the transmitting device 27 could also be fixed to the air valve 7 in another manner, by way of example in a non-positive locking manner, a positive locking manner or a frictional locking manner.

Furthermore, in the case of the embodiment of the air valve 7 that is illustrated in FIG. 5, the transmitting device 27 is embodied such that the respective sensor contact element 19 of the temperature sensor 17 is in physical contact with the corresponding transmitter contact element 35. The cables 31 (FIG. 2) are therefore not provided in this case. Specifically, the sensor contact elements 19 are embodied in this case in a rod-like manner and the transmitter contact elements 35 are embodied in a plate-shaped manner.

Figure 6:
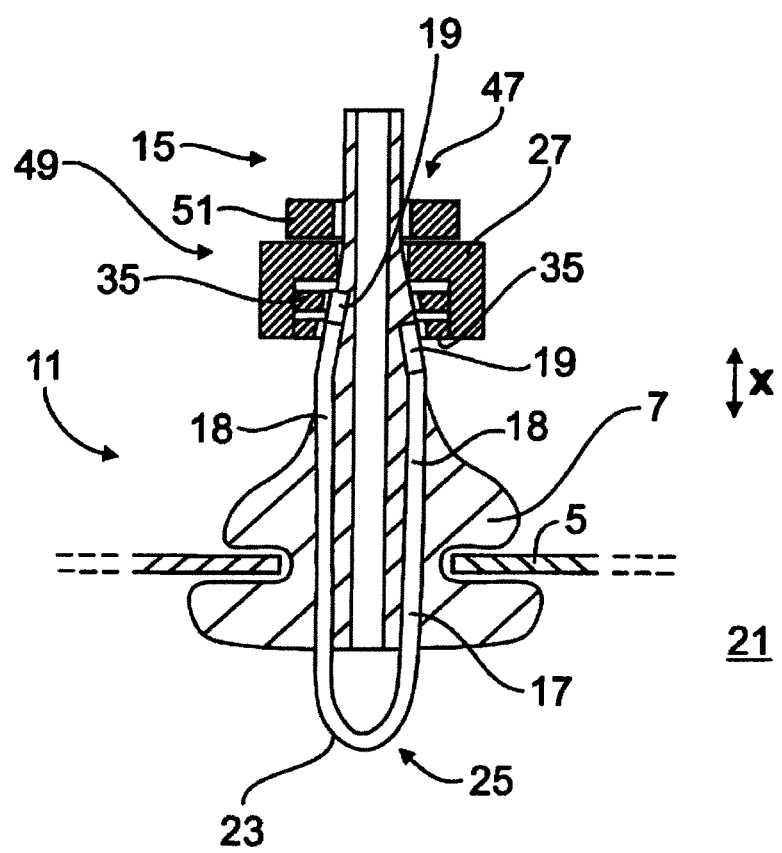
FIG. 6 illustrates in accordance with FIG. 2 the air valve in a third embodiment form.

FIG. 6 illustrates a third embodiment of the air valve 7. In contrast to the second embodiment that is illustrated in FIG. 5, the transmitter contact elements 35 are embodied in an annular manner. In this manner, it is possible to bring the transmitter contact elements 35 and the sensor contact elements 19 into physical contact with one another in a particularly reliable manner.

Figure 7:
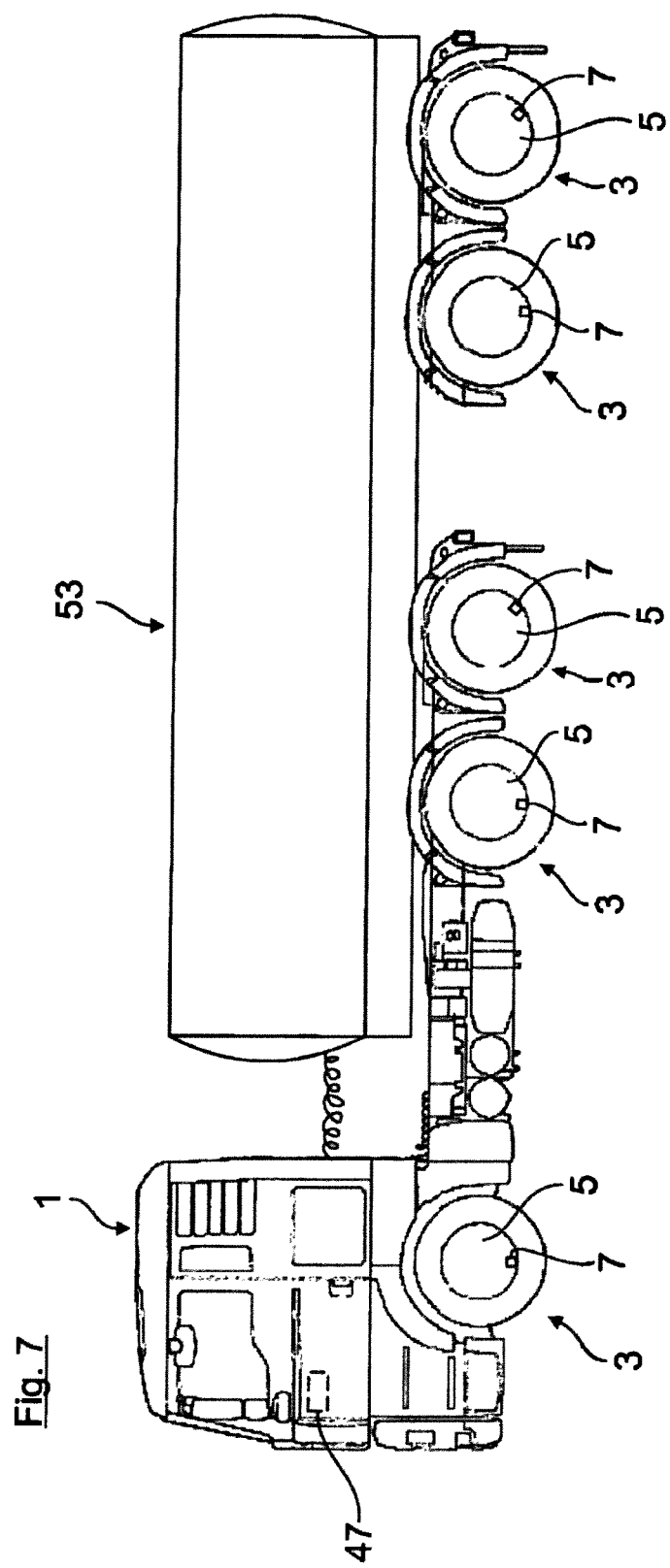
FIG. 7 illustrates a side view of a vehicle tandem having the device in accordance with the invention.

In FIG. 7, the truck 1 is coupled to a trailer 53 so that the truck 1 and the trailer 53 form a vehicle tandem. Each vehicle tire 3 of the vehicle tandem comprises the air valve 7, whereby the temperatures of all the vehicle tires 3 of the vehicle tandem are measured.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for assisting a driver of a vehicle (1), the vehicle (1) having: at least one vehicle tire (3) embodied as a pneumatic tire, at least one temperature sensor (17) configured to measure a temperature of the at least one vehicle tire (3), an indicating device (41) configured to indicate to the driver of the vehicle (1) information regarding the state of the at least one vehicle tire (3), a closed loop control device and/or open loop control device (39) connected to the temperature sensor (17) in a signal-transmitting manner, the closed loop control device and/or open loop control device (39) being configured to control an indication procedure of the indicating device (41) in a closed loop and/or open loop manner, the closed loop control device and/or open loop control device (39) being switchable into multiple warning stages, the method comprising:

if at least one temperature value measured by the temperature sensor (17) exceeds a first defined threshold value (TG1), the closed loop control device and/or the open loop control device (39) switching in a self-acting manner into a first warning stage in which it is indicated to the driver by the indicating device (41) that the driver is to stop the vehicle (1) within a defined period of time and/or within a defined section of road, and if the measured temperature value exceeds a second defined threshold value (TG2), greater than the first threshold value (TG1), the closed loop control device and/or open loop control device (39) switching in a self-acting manner into a second warning stage in which it is indicated to the driver by the indicating device (41) that the driver is to stop the vehicle (1) immediately, wherein the closed loop control device and/or open loop control device (39) is connected to a navigation system (43) of the vehicle (1) in a signal-transmitting manner, the method further comprising:

altering, by the closed loop control device and/or open loop control device (39), a route planned by the navigation system (43), taking into account the defined period of time and/or the defined section of road.

2. The method according to claim 1, further comprising:
if the measured temperature value does not exceed the first threshold value (TG1), the closed loop control device and/or open loop control device (39) switching in a self-acting manner into a basic mode in which information regarding the state of the vehicle tire (3) is not indicated to the driver by the indicating device (41).

3. The method according to claim 1, wherein the closed loop control device and/or open loop control device (39) is connected to a speed regulating system (46) of the vehicle (1) in a signal-transmitting manner, the method further comprising:

if a prevailing vehicle speed is greater than the defined speed value, regulating and/or controlling the vehicle speed by the speed regulating system (46) such that the vehicle (1) does not exceed the defined speed value.

4. The method according to claim 1, wherein the closed loop control device and/or open loop control device (39) comprises a predicting device (45) configured to predict and/or forecast a future increase in temperature of the vehicle tire (3) based upon at least one tire temperature parameter, the defined period of time and/or the defined section of road being determined by the closed loop control device and/or open loop control device (39) based on a predicted increase in temperature of the vehicle tire (3), wherein the at least one tire temperature parameter comprises at least one temperature value measured by the temperature sensor (17) and/or by a prevailing and/or future traffic situation of the vehicle (1).

5. The method according to claim 1, wherein the vehicle is a commercial vehicle.

6. The method according to claim 1, wherein the indicating device is a visual and/or acoustic indicating device.

7. A device for assisting a driver of a vehicle, the device comprising:
- at least one vehicle tire (3) embodied as a pneumatic tire;
- at least one temperature sensor (17) configured to measure a temperature of the vehicle tire (3);
- an indicating device (41), configured to indicate to the driver of the vehicle (1) information regarding the state of the at least one vehicle tire (3);
- a closed loop control device and/or open loop control device (39) connected to the temperature sensor (17) in a signal-transmitting manner, the closed loop control device and/or open loop control device (39) being configured to control an indication procedure of the indicating device (41) in a closed loop and/or open loop manner, the closed loop control device and/or open loop control device (39) being switchable into multiple warning stages, such that:
  if at least one temperature value measured by the temperature sensor (17) exceeds a first defined threshold value (TG1), the closed loop control device and/or open loop control device (39) switches in a self-acting manner into a first warning stage in which it is indicated to the driver by the indicating device (41) that the driver is to stop the vehicle (1) within a defined period of time and/or within a defined section of road, and
  if the measured temperature value exceeds a second defined threshold value (TG2), greater than the first threshold value (TG1), the closed loop control device and/or open loop control device (39) switches in a self-acting manner into a second warning stage in which it is indicated to the driver by the indicating device (41) that the driver is to stop the vehicle (1) immediately,
- wherein the closed loop control device and/or open loop control device (39) is connected to a navigation system (43) of the vehicle (1) in a signal-transmitting manner, and
- the closed loop control device and/or open loop control device (39) alters a route planned by the navigation system (43), taking into account the defined period of time and/or the defined section of road.

8. The device according to claim 7, wherein the temperature sensor (17) is connected to the closed loop control device and/or open loop control device (39) in a signal-transmitting manner by a wireless signal-transmitting device (29), wherein a transmitting device (27) of the signal-transmitting device (29) is allocated to the temperature sensor (17), the transmitting device (27) being configured to transmit a measuring signal of the temperature sensor (17) to a receiving device (37) of the signal-transmitting device (29), said receiving device (37) being allocated to the closed loop control device and/or open loop control device (39).

9. The device according to claim 8, wherein the temperature sensor (17) comprises at least one sensor contact element (19) connectable in a signal-transmitting manner to at least one transmitter contact element (35) of the transmitting device (27), said transmitter contact element (35) being coupled to the sensor contact element (19) so as to connect the temperature sensor (17) and transmitting device (27) in a signal-transmitting manner.

10. The device according to claim 9, wherein the at least one sensor contact element (19) is configured in a rod-like manner, and/or the at least one transmitter contact element (19) is configured in an annular and/or plate-shaped manner.

11. The device according to claim 9, further comprising a signal-transmitting device (31) configured to connect the sensor contact element (19) and the transmitter contact element (35) to one another in a signal-transmitting manner.

12. The device according to claim 8, wherein the at least one vehicle tire (3) has a hollow chamber (21) filled with air and both the transmitter device (27) and the sensor contact element (19) are arranged outside the hollow chamber (21).

13. The device according to claim 8, further comprising a fixing device configured to affix the transmitting device (27) to an air valve (7) of the at least one vehicle tire (3), wherein the affixed transmitting device (27) at least partially surrounds the air valve (7) in an annular manner with a defined spacing.

14. The device according to claim 13, wherein the fixing device comprises at least one clamping element (51) configured to clamp and/or to press the transmitting device (27) against an air valve-side stop (49), the clamping element (51) being formed by a fastening element that can be screwed on to the air valve (7) by a nut.

15. The device according to claim 14, wherein the temperature sensor (17) is at least partially vulcanized into the air valve (7), the at least one sensor contact element (19) and/or a measuring region of the temperature sensor (17) being exposed to the exterior and/or protruding from the air valve (7) so as to measure the tire temperature.

16. The device according to claim 7, wherein the at least one vehicle tire (3) has a hollow chamber (21) filled with air, and wherein the temperature sensor (17) is affixed to an air valve (7) of the at least one vehicle tire (3), the temperature sensor (17) being affixed to the air valve (7) such that the temperature sensor can measure the air temperature in the hollow chamber (21).

17. The device according to claim 7, wherein the indicating device is a visual and/or acoustic indicating device.

18. The device according to claim 7, wherein the vehicle is a commercial vehicle.

19. An air valve on a vehicle tire embodied as a pneumatic tire, said air valve being usable with a device as claimed in claim 7, wherein a temperature sensor (17) is affixed to the air valve (7) so that the temperature sensor (17) and the air valve (7) form an assembly unit, the temperature sensor (17) being affixed to the air valve (7) such that the temperature sensor can measure the air temperature in a hollow chamber (21) of the pneumatic tire (3), wherein the temperature sensor (17) is connected to the closed loop control device and/or open loop control device (39) in a signal-transmitting manner by a wireless signal-transmitting device (29), wherein a transmitting device (27) of the signal-transmitting device (29) is allocated to the temperature sensor (17), the transmitting device (27) being configured to transmit a measuring signal of the temperature sensor (17) to a receiving device (37) of the signal-transmitting device (29), said receiving device (37) being allocated to the closed loop control device and/or open loop control device (39), further comprising a fixing device configured to affix the transmitting device (27) to an air valve (7) of the at least one vehicle tire (3), wherein the fixing device comprises at least one clamping element (51) configured to clamp and/or to press the transmitting device (27) against an air valve-side stop (49), and wherein the fixing device comprises at least one clamping element (51) configured to clamp and/or to press the transmitting device (27) against an air valve-side stop (49), the clamping element (51) being formed by a fastening element that can be screwed on to the air valve (7).

* * * * *